MULTIPLEX TRANSMITTER AND CENTRAL STATION SYSTEM

Filed Aug. 16, 1966

INVENTOR.
HAROLD D. ERVIN

BY [signature]

3,550,086

MULTIPLEX TRANSMITTER AND CENTRAL STATION SYSTEM

Harold D. Ervin, 7020 Quakertown Ave., Canoga Park, Calif. 91306

Filed Aug. 16, 1966, Ser. No. 572,766
Int. Cl. H04q 9/00
U.S. Cl. 340—150 2 Claims

ABSTRACT OF THE DISCLOSURE

A security alarm system having a multiplex transmitter unit that develops a plurality of current regulated output signals for display at a central station electrically connected to the transmitter unit.

BACKGROUND OF THE INVENTION

It is particularly desirable in security alarm systems to monitor several local stations or premises at a central station that may be several miles away; however, it is not desirable to connect each local station to the central station by a separate pair of telephone wires. It is also desirable to identify each local station signal at the central station without cross-signalling between the central station and the local station. And it is also desirable to sharply regulate any output signal from the local station to the central station so that the system is not damaged by an overload or short circuit condition in the connecting telephone wires.

OBJECTS OF THE INVENTION

Accordingly, it is an object of the invention to provide a new and improved multiplex transmitter unit and cooperating central station unit that process and display an identifiable signal that corresponds to an initiating input signal.

Another object of the invention is to provide a new and improved multiplex unit that develops current regulated output signals corresponding to a plurality of simultaneous input signals.

Likewise, it is an object of the invention to provide a new and improved multiplex unit that transmits current regulated output signals to a central station unit over a single pair of electrical conductors.

A further object is to provide a central station unit that identifies and displays input signals from a multiplex transmitter unit without cross-signalling between the central station and the multiplex transmitter.

Yet another object is to provide a new and improved multiplex transmitter unit having a current regulator means to develop current regulated output signals from the unit.

A further object is to provide a new and improved multiplex transmitter unit and cooperating central station unit having a voltage bandwidth relay means responsive to a predetermined input signal from the multiplex transmitter unit and developing a corresponding output signal identifiable with an initiating input signal at the multiplex transmitter unit.

SUMMARY OF THE INVENTION

Briefly, in accordance with one form of my invention in one operating embodiment, a new and improved multiplex transmitter unit and cooperating central station unit are provided in which the multiplex transmitter unit is responsive to a plurality of simultaneous initiating input signals, each identifiable with the happening of a predetermined occurrence, and includes current regulator means that develop current regulated output signals that correspond to each of the input signals. The current regulated output signals are preferably transmitted over a single pair of electrical conductors to the central station unit that processes the incoming output signals and includes voltage bandwidth relay means responsive to respective predetermined signals and generating corresponding signals that can be suitably displayed at the central station and identified as corresponding to the particular initiating input signal at the multiplex transmitter unit.

Further objects, features and the attending advantages of the present invention will be apparent when the following description is read in conjunction with the accompanying drawing.

DESCRIPTION OF THE INVENTION

Figures 1, 2, 3, 4:
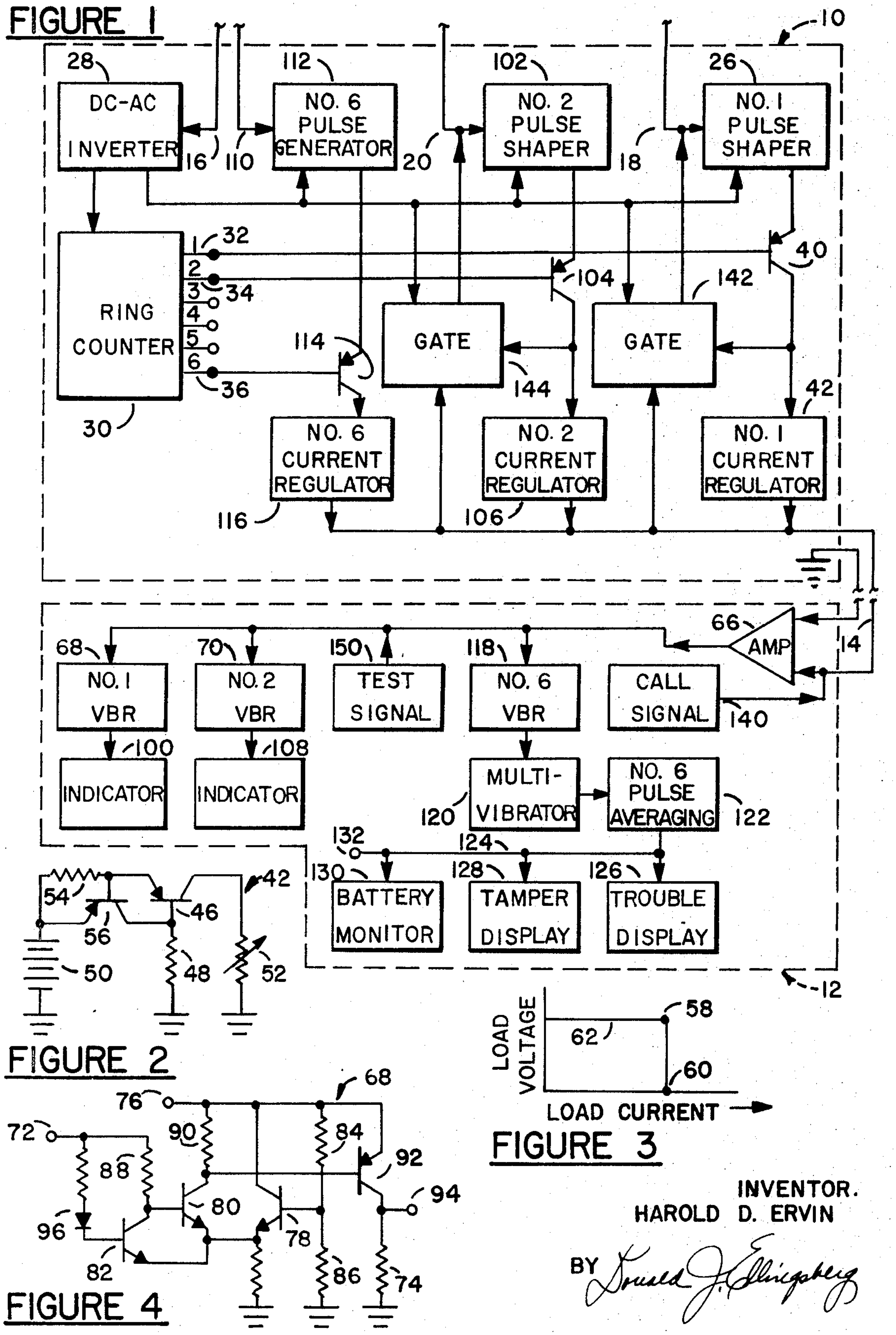
FIG. 1 is a block diagram of a portion of a security alarm system in which the invention finds use.
FIG. 2 is an electrical schematic of the current regulator portion of the block diagram of FIG. 1.
FIG. 3 is a typical load voltage-current characteristic of the current regulator of FIG. 2.
FIG. 4 is an electrical schematic of the voltage bandwidth relay (VBR) portion of the block diagram of FIG. 1.

Referring to FIG. 1, a multiplex transmitter module 10 is connected to a central station module 12 by conventional electrical conductors, preferably a pair of telephone wires 14. The multiplex transmitter module and the central station module can be used with existing local and central station alarm systems, particularly with a security alarm system disclosed in my copending application for a "Security Alarm System," filed even date herewith.

The multiplex transmitter module 10 is connected to a source of electrical power, such as a conventional battery at the local station or premises monitored by the security alarm system wherein the present invention finds use, through lead 16. An incoming signal voltage that corresponds to the happening of a predetermined occurrence at a first local station, usually the happening of an unwanted occurrence, passes to the multiplex transmitter module 10 through lead 18. In a similar manner, an incoming signal voltage from a second local station passes through lead 20. Similarly, incoming signal voltages from a total of five local stations can be serviced by the multiplex transmitter module 10. It is contemplated that any number of local stations generating incoming voltage signals can be accommodated by the invention as will be evidenced in the description hereinafter. Since each incoming signal voltage is processed in a similar manner, the incoming signal voltage at lead 18 will be traced in detail in FIG. 1. It is understood that the incoming voltage signal on lead 20, or any other incoming voltage signal from separate local stations, will be processed in a similar manner.

The incoming voltage signal passes through lead 18 to a pulse shaper 26 in the multiplex transmitter module 10 of FIG. 1. Voltage from power lead 16 passes through a conventional DC-AC converter 28 to a ring counter 30. In the embodiment shown, ring counter 30 has six stages; however, for purposes of description only stages 32, 34 and 36 will be considered. Voltage from the ring counter 30 is applied through stage 32 to the base of gate transistor 40. The voltage from stage 32 of the ring counter 30 is applied to the base of gate transistor 40 for a predetermined time cycle and then reduced in a conventional manner for a timed portion of the ring counter cycle. When the base voltage of transistor 40 is reduced, the shaped pulse corresponding to the incoming voltage signal passes from the pulse shaper 26 to a current regulator 42. Current regulator 42 is responsive to the voltage input and functions to develop a regulated current output so that if an overload or short circuit should occur in the telephone wires 14, the current output from the multiplex transmitter module 10 is regulated to a predetermined and constant level.

The current regulator 42 is shown by FIG. 2. The current regulator circuit is in part conventional (see U.S. Pat. No. 2,697,811 to Deming; and "Transistor Power Supply Has Overload Protection" in the June 20, 1958 issue of Electronics at pages 74 and 75); however, current regulation is substantially improved with the electrical circuit as shown by FIG. 2. Transistor 46 is normally biased into saturation by current passing through resistor 48. The power input voltage, such as voltage from battery 50, less the saturated collector-to-emitter voltage of transistor 46 is across the load, schematically shown as variable resistor 52. The voltage drop across resistor 54 is small when the load 52 is small; however, as the load current increases, the voltage drop across resistor 54 also increases. When the voltage drop across resistor 54 increases to the base-to-emitter threshold voltage of transistor 56, transistor 56 conducts and sharply limits the forward bias of transistor 46. This results in a highly regulated current as shown by FIG. 3 between points 58 and 60 of curve 62. Curve 62 represents the load voltage developed across a load for an increasing load current. The near vertical slope of curve 62 between points 58 and 60 results from the current regulator circuit as shown by FIG. 2, and is used in the multiplex transmitter 10 of FIG. 1 as the current regulator 42.

Referring again to FIG. 1, the sharply regulated current pulse passes through the telephone wires to a DC amplifier 66 in the central station module 12. Amplifier 66 is responsive to the current pulse input and develops a voltage output that is proportional to the regulated current input. The proportional voltage output passes from amplifier 66 to voltage bandwidth relays (VBR) 68 and 70.

The voltage bandwidth relay (VBR) 70 of FIG. 1 is shown by FIG. 4. When a variable DC voltage, e.g., from zero to 10 volts, is applied to terminal 72, the VBR 70 develops a positive output voltage across resistor 74 for a predetermined range and level of input voltage. The VBR 70 does not develop a positive output voltage across resistor 74 above and below the predetermined range and level of input voltage.

In the VBR of FIG. 4, voltage is applied through terminal 76 to transistor 78 which is an emitter follower. The emitter output of transistor 78 provides a low impedance reference or emitter voltage to the emitters of transistors 80 and 82. The low impedance reference voltage is determined by the selected values of resistors 84 and 86 that are connected as a voltage divider. The emitter voltage determines the lower level at which the DC input voltage will initiate a positive voltage output across resistor 74. As the variable DC voltage applied to terminal 72 increases, base current passes through resistor 88 and turns on transistor 80. This increases the voltage drop across resistor 90 and the applied voltage at the base of switch transistor 92 turns on transistor 92. Transistor 92 conducts and connects voltage from terminal 76 across resistor 74 which develops a positive output voltage signal at terminal 94. As the voltage at terminal 72 continues to increase, diode 96 breaks down and causes transistor 82 to conduct and enter into saturation. Transistor 80 is then biased off and switch transistor 92 is turned off so that the voltage across resistor 74 drops to zero. A positive output voltage signal is no longer developed at terminal 94.

In the VBR 70 of FIG. 4, the voltage bandwidth of the positive output voltage signal at terminal 94 is determined by the forward drop characteristic of diode 96. The voltage bandwidth, accordingly, can be increased by placing additional diodes in electrical series with diode 96. It is contemplated that diode 96 can be replaced with a suitable battery or other power supply having a voltage output that can be varied to accurately control the voltage bandwidth over a wide range. The lower range of the voltage bandwidth can be controlled by replacing the voltage divider resistors 84 and 86 with a suitable potentiometer. It is also contemplated that transistor 78 can be eliminated when adequate current is provided through resistors 84 and 86. However, the base-to-emitter voltage variation with temperature of transistor 78 will no longer compensate for a similar temperature variation in transistor 80. This will result in the change of input threshold voltage necessary to turn on transistor 80 at about 1.8 millivolt per degree centigrade (mv./° C.). Transistor 92 can also be eliminated if the output impedance of transistor 80 is capable of driving the load. If transistor 92 is eliminated, the amplitude of the positive output voltage signal at terminal 94 will be reduced from a value approximately equal to the voltage applied at terminal 76 to a value equal to the voltage applied at terminal 76 less the emitter voltage at transistor 80; consequently, the bandwidth skirts of the output voltage will be more rounded.

Referring again to FIG. 1, the proportional voltage output from amplifier 66 to VBR 68 and VBR 70 will be processed preferably by only one VBR as determined by matching the voltage output from the amplifier to a VBR having a predetermined and corresponding input voltage range and level. Since the proportional voltage output from amplifier 66 originated at the first station, VBR 68 responds to the amplifier output in the central station embodiment illustrated. VBR 68 develops a positive output voltage signal as described hereinbefore that passes to a suitable indicator means 100, which may include a conventional alarm bell or buzzer and signal lamp, that is actuated thereby and identifiable at the central station module 12 as originating at the first local staion.

The incoming signal voltage on lead 20 from a second local station is processed in a manner similar to that described hereinbefore for the first local station signal on lead 18. The incoming signal voltage on lead 20 passes through a pulse shaper 102 to gate transistor 104. The signal passes through gate transistor 104 to current regulator 106 when the ring counter 30 periodically reduces the voltage applied to the base of the transistor from stage 34. The regulated current output passes from current regulator 106 over telephone wires 14 to the DC amplifier 66 where a proportional voltage output is generated. Since the proportional voltage output from amplifier 66 originated at the second station, VBR 70 has a predetermined input voltage range and level that corresponds to this voltage output. VBR 70 develops a positive output voltage signal that passes to indicator means 108 where it is identifiable at the central station module 12 as originating at the second local station.

Incoming signals from other local stations are processed in a similar manner to that described hereinbefore for the first and second local stations on leads 18 and 20, respectively. The number of stations that can be processed through the multiplex transmitter module 10 and the central station module 12 is determined by the number of stages of the particular ring counter and associated circuit components that are used.

The multiplex transmitter module 10 in FIG. 1 can process an incoming signal on lead 110 that originates, in the preferred embodiment, when a tamper switch cooperating with the multiplex module is opened. For example, the multiplex transmitter module 10 could be contained in a wall mounted case having a lockable door. If the locked door were forced open by an intruder or burglar, a conventional switch cooperating with the door would be opened.

The incoming tamper signal on lead 110 actuates an interlock circuit in pulse generator 112 so that pulse generator 112 generates an output voltage pulse that reduces the total number of pulses passing through gate transistor 114 from stage 36 of the ring counter 30. All voltage pulses from gate transistor 114 pass through current regulator 116 to the DC amplifier 66 in the central station module 12 in a manner similar to that described hereinbefore. The proportional voltage output from amplifier 66 is received by VBR 118 that develops a positive output voltage signal. The voltage signal from VBR 118 passes to a conventional monostable multivibrator 120 which feeds output pulses having equal and positive symmetry to a pulse averaging unit 122. Pulse averaging unit 122 averages the incoming pulses from multivibrator 120 and generates a corresponding DC voltage output signal that reflects the average voltage of the total incoming pulses. The voltage output signal from pulses averaging unit 122 is fed through lead 124 to a trouble display indicator 126, a tamper display indicator 128, and a battery monitor display indicator 130.

The DC voltage output signals from the pulse averaging unit 122 actuates or energizes tamper display indicator 128 since the voltage output signal has been reduced to a predetermined actuating level by the reduced signal output through gate transistor 114. This corresponds to the actuating level of tamper display 128. When the frequency output, i.e., the number of pulses, from stage 36 of ring counter 30 is reduced by a decrease in battery voltage fed to the multiplex transmitter module 10 through lead 16, the DC voltage output signal from the pulse averaging unit 122 is also reduced to a voltage level that corresponds to the actuating or energizing voltage level of voltage display indicator 130. Voltage display 130 alerts the central station that the battery voltage has reached a predetermined low level. In a similar manner, trouble display indicator 126 is actuated or energized when there is a loss of continuity in the connecting telephone wires 14 or when the wires are shorted because the frequency output from stage 36 of ring counter 30 is no longer applied to the central station module 12. The loss of input frequency causes the DC voltage output signal from the pulse averaging unit 122 to go to zero which actuates trouble display 126 and is identifiable at the central station as a trouble situation, normally in the telephone wires 14.

The DC voltage output signal can be measured at point 132 and read-out as a value which corresponds to the battery voltage fed through lead 16 to the multiplex transmitter module 10.

Local stations connected to the multiplex transmitter module 10, for example, the first and second local stations connected through leads 18 and 20, respectively, can be signalled from the central station module 12 in response to an alerting signal from a local station. A common call signal is provided for each local station by call signal generator 140. A call signal passes from call signal generator 140 over the telephone wires 14 to the multiplex transmitter module 10. If the call signal is for the first local station which is connected through lead 18, the call signal passes through gate 142 which is closed by the previous alerting signal pulse from the local station. The call signal passes through lead 18 to the local station to signal the receipt at the central station of the alerting signal, such as a closing signal. In a similar manner, the second local station can be signalled through gate 144.

The components in the central station 12, in particular VBR's 68, 70 and 118, can be checked by generating a test signal which duplicates those signals received at the central station from multiplex transmitter module 10. The signal generator 150 selectively generates such test signals.

As will be evidenced from the foregoing description, certain aspects of my invention are not limited to the particular details as illustrated and described, and it is contemplated that other modifications and applications will occur to those skilled in the art.

I claim:

1. A transmitter and receiver system comprising:

(a) first multiplex means including a current regulator means responsive to a plurality of simultaneous initiating signals and generating respective current regulated output signals, said current regulator means comprises:
  (1) resistor means having a variable resistance,
  (2) first transistor means connected in electrical series with said resistor means and normally biased into saturation by an input current,
  (3) second transistor means having a selective turn-on voltage and electrically connected across said resistor means and to said first transistor means so that an increasing input current turns on said second transistor means at said selective turn-on voltage and thereby limits the forward bias of said first transistor means whereby the input current is regulated, and (b) second receiver means including a voltage bandwidth relay means selectively responsive to singular ones of said output signals and generating corresponding signals so that each of said corresponding signals are identifiable as respective initiating signals.

2. The transmitter and receiver system of claim 1 in which said voltage bandwidth relay means comprises:

(a) first means generating a reference signal, said reference signal determining a first signal level,
(b) second means responsive to an initiating signal having a variable signal including at least said first signal level and a second signal level,
(c) third means responsive to said reference signal and said initiating signal, and generating an identifiable output signal, and
(d) fourth means selectively responsive to said initiating signal and determining said second signal level, and further generating an off signal at said second signal level,
(e) said third means further responsive to said off signal so that said third means no longer generates said output signal.

References Cited

UNITED STATES PATENTS 2,642,527 6/1953 Kelley ............ 340—353X
3,225,347 12/1965 Doyle ............. 340—347

FOREIGN PATENTS 776,779 6/1957 Great Britain ..... 340—147SC

OTHER REFERENCES

AMRL–TDR–63–96 publication, October 1963, "Research and Development on Pulse-Modulated Personal-Telemetry Systems," Adolf R. Marko et al., pp. 1–19.

DONALD J. YUSKO, Primary Examiner

U.S. Cl. X.R.

340—167